Figure 1:
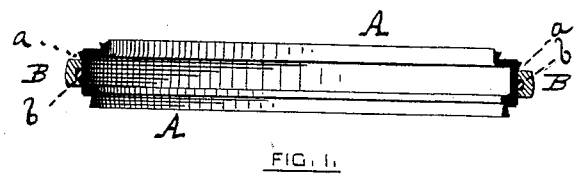

T. A. HOPKINS.
Center-Rim for Watch-Cases.

No. 203,046. Patented April 30, 1878.

ATTEST:

INVENTOR:

Thomas A Hopkins

UNITED STATES PATENT OFFICE.

THOMAS A. HOPKINS, OF PROVIDENCE, RHODE ISLAND.

IMPROVEMENT IN CENTER RIMS FOR WATCH-CASES.

Specification forming part of Letters Patent No. 203,046, dated April 30, 1878; application filed June 11, 1877.

*To all whom it may concern:*

Be it known that I, THOMAS A. HOPKINS, of the city and county of Providence, in the State of Rhode Island, have invented a new and useful Improvement in Center Rims of Watch-Cases, and declare the following to be a specification thereof, reference being had to the accompanying drawing, which shows a transverse section of my invention on the line of the diameter of the watch-case.

My invention consists in making the center rim in two parts—an inner ring and an outer center band—and also in the method of uniting them together by solder in a central groove on the inner surface of the center band.

I roll a strip of sheet metal into the proper shape, as shown in the drawing, and, bending the same into a circle, unite the two ends, and form the inner ring or rim A, provided with the usual bezel and cap-snaps. The outer or center band B is a ring, which fits snugly upon the outer surface of the rim A, and bears against the bevel $a$ of the cap-snap, or against a suitable shoulder on the rim A. The inner surface of the band B has a continuous central groove or channel, $b$, extending along the whole inside circumference. I fill this with solder, then slip the band B upon the rim A, and, heating the solder, unite the parts firmly.

It is obviously within my invention, if, instead of having a continuous groove, the inner surface of the band B is furrowed or hollowed in several places to contain the solder, for the purpose aforesaid.

My invention is especially designed for plated watch-cases. By making the center rim in two parts, as described, I am able to use stock of different qualities—an inferior plate for the inner rim and a heavier plate on the outer and exposed band. The method of uniting the two parts by the interior soldering of them together is a great advantage, as the solder is nowhere visible, while the whole is as solid and strong as if made of one piece of metal.

I claim, as a novel and useful invention, and desire to secure by Letters Patent—

The improved center rim for watch-cases herein described, consisting of the inner rim A, in combination with the outer or center band B, the latter fitting upon the former, and being provided internally with a central groove, $b$, for containing the solder which unites the two parts together, substantially as specified.

THOMAS A. HOPKINS.

Witnesses:
WILLIAM M. CORNWALL,
WARREN R. PERCE.